United States Patent
Reppa

(10) Patent No.: US 10,376,815 B2
(45) Date of Patent: Aug. 13, 2019

(54) OILY WASTE TREATMENT ARRAY FOR USE IN MARPOL PLANT IN URBAN ENVIRONMENTS

(71) Applicant: Hellenic Environmental Center S.A., Piraeus (GR)

(72) Inventor: Georgia Reppa, Piraeus (GR)

(73) Assignee: HELLENIC ENVIRONMENTAL CENTER S.A., Pireaus (GR)

( * ) Notice: Subject to any disclaimer, the term of this patent is extended or adjusted under 35 U.S.C. 154(b) by 383 days.

(21) Appl. No.: 14/915,589

(22) PCT Filed: Dec. 19, 2013

(86) PCT No.: PCT/GR2013/000066
§ 371 (c)(1),
(2) Date: Feb. 29, 2016

(87) PCT Pub. No.: WO2015/067973
PCT Pub. Date: May 14, 2015

(65) Prior Publication Data
US 2016/0214034 A1    Jul. 28, 2016

(30) Foreign Application Priority Data

Nov. 11, 2013 (GR) ................................ 20130100638

(51) Int. Cl.
*C02F 9/00* (2006.01)
*B01D 17/04* (2006.01)
(Continued)

(52) U.S. Cl.
CPC ......... *B01D 17/042* (2013.01); *B01D 17/041* (2013.01); *B01D 17/047* (2013.01);
(Continued)

(58) Field of Classification Search
None
See application file for complete search history.

(56) References Cited

U.S. PATENT DOCUMENTS

| | | | | |
|---|---|---|---|---|
| 4,746,440 A | * | 5/1988 | Seeger | B01D 17/0205 209/169 |
| 4,936,986 A | * | 6/1990 | Tarves, Jr. | B01D 17/0217 210/321.64 |

(Continued)

FOREIGN PATENT DOCUMENTS

GB        2101900 A        1/1983

OTHER PUBLICATIONS

International Search Report, dated Jul. 11, 2014 in connection with PCT International Application No. PCT/GR2013/000,066, filed Dec. 19, 2013.

*Primary Examiner* — Jonathan M Peo
(74) *Attorney, Agent, or Firm* — John P. White; Cooper & Dunham LLP

(57) ABSTRACT

An oily waste treatment array (23) is described, for use in a Marpol plant, allows the separation of low and high-flash-point material into high-flash-point dehydrated recovered oil, cleaned water, and solids, that can be operated in an urban environment. This can be achieved due to the coupling of six constituent devices, linked within the confines (28) of the sealed array (23), that enables odor control, and due to the unique treatment (30), prior to the centrifuge array (31). The pre-treatment array (30) allows the treatment of emulsified mixtures, optimizing the use of chemical additives, by use of an external-flow-array, that is thermally coupled and integrated within the overall array, that features an external circulation heating/stirring loop, in and out of an inclined and contracting tank (20), a 'stirring region' (41) and a series of three dimensional injection nozzles (9), making up a 'dendrite' structure (10).

20 Claims, 2 Drawing Sheets

(51) Int. Cl.
*C02F 1/04* (2006.01)
*C02F 1/38* (2006.01)
*C02F 103/36* (2006.01)

(52) U.S. Cl.
CPC ............... *C02F 1/04* (2013.01); *C02F 1/385* (2013.01); *C02F 9/00* (2013.01); *C02F 2103/365* (2013.01); *C02F 2201/002* (2013.01)

(56) References Cited

U.S. PATENT DOCUMENTS

| | | | | |
|---|---|---|---|---|
| 5,098,584 | A * | 3/1992 | Leen | B01D 37/00 210/768 |
| 5,122,165 | A * | 6/1992 | Wang | B01D 19/0005 95/158 |
| 6,132,630 | A * | 10/2000 | Briant | B01D 17/00 210/774 |
| 2003/0136737 | A1* | 7/2003 | Glynn | B01D 17/04 210/636 |
| 2009/0242384 | A1* | 10/2009 | Curcio | B01F 3/088 204/168 |
| 2010/0080077 | A1* | 4/2010 | Coy | B01F 5/0206 366/137 |
| 2011/0174695 | A1 | 7/2011 | Goldman | |
| 2012/0246999 | A1* | 10/2012 | Stern | C10G 45/02 44/300 |

* cited by examiner

OILY WASTE TREATMENT ARRAY FOR USE IN MARPOL PLANT IN URBAN ENVIRONMENTS

CROSS-REFERENCE TO RELATED APPLICATIONS

This application is a § 371 national stage of PCT International Application No. PCT/GR2013/000,066, filed Dec. 19, 2013, claiming the priority of Greek Patent Application No. 20130100638, filed Nov. 11, 2013, the entire content of each of which is hereby incorporated by reference into the application.

FIELD OF THE INVENTION

The present invention relates to an array that allows the treatment of oily waste, within a Marpol plant.

DESCRIPTION OF RELATED ART

Up till the present, there have been devices for use in the treatment of oily waste. The present array described herein, introduces a novel device array that allows the optimal separation of oily waste into three by-products, namely recovered oil, treated water and solids, that can be achieved with low energy consumption, with odor-free conditions, that can be applied in an urban environment.

BRIEF SUMMARY

The object of the present invention is the integration of a novel pre-treatment device into an overall array that enables the optimal separation of oily waste, that is energy efficient and environmentally friendly.

The resulting array is made up of six subsystems that are inextricably connected in terms of their internal heat flows and sealed within the confines of the array. This allows: 1, the optimal treatment of oily waste, 2, under conditions that can be applied in urban environments.

According to the invention, the objective is achieved by integrating into one array the six constituent components, that are linked to each other and sealed within the confines of the array, offering optimal separation of the original oily waste product, due to the unique action of the pretreatment device, as defined in independent claim 1. The dependent claims define preferred embodiments of the invention.

In the following, a preferred embodiment of the invention will be discussed in more detail, with reference to the accompanying drawings.

The invention will be made conceivable with reference to the designs that accompany the present description, in which certain proposed industrial applications of the invention are shown.

DETAILED DESCRIPTION

Figure 1:
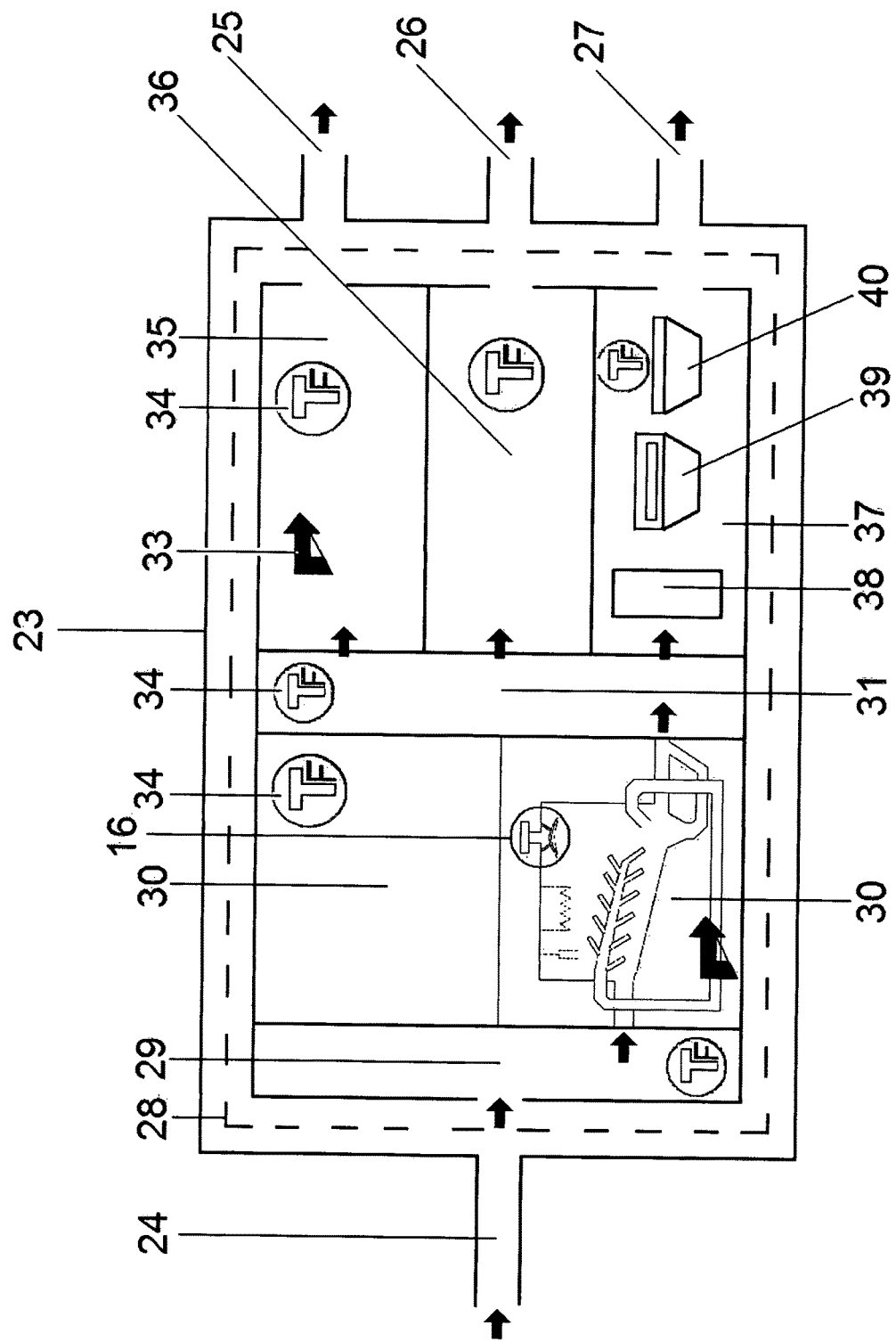
FIG. 1 shows a view of the array that depicts its constituent parts and the overall confines of the array, that provide total odor control, that in turn, allows its use within urban environments.
Figure 2:
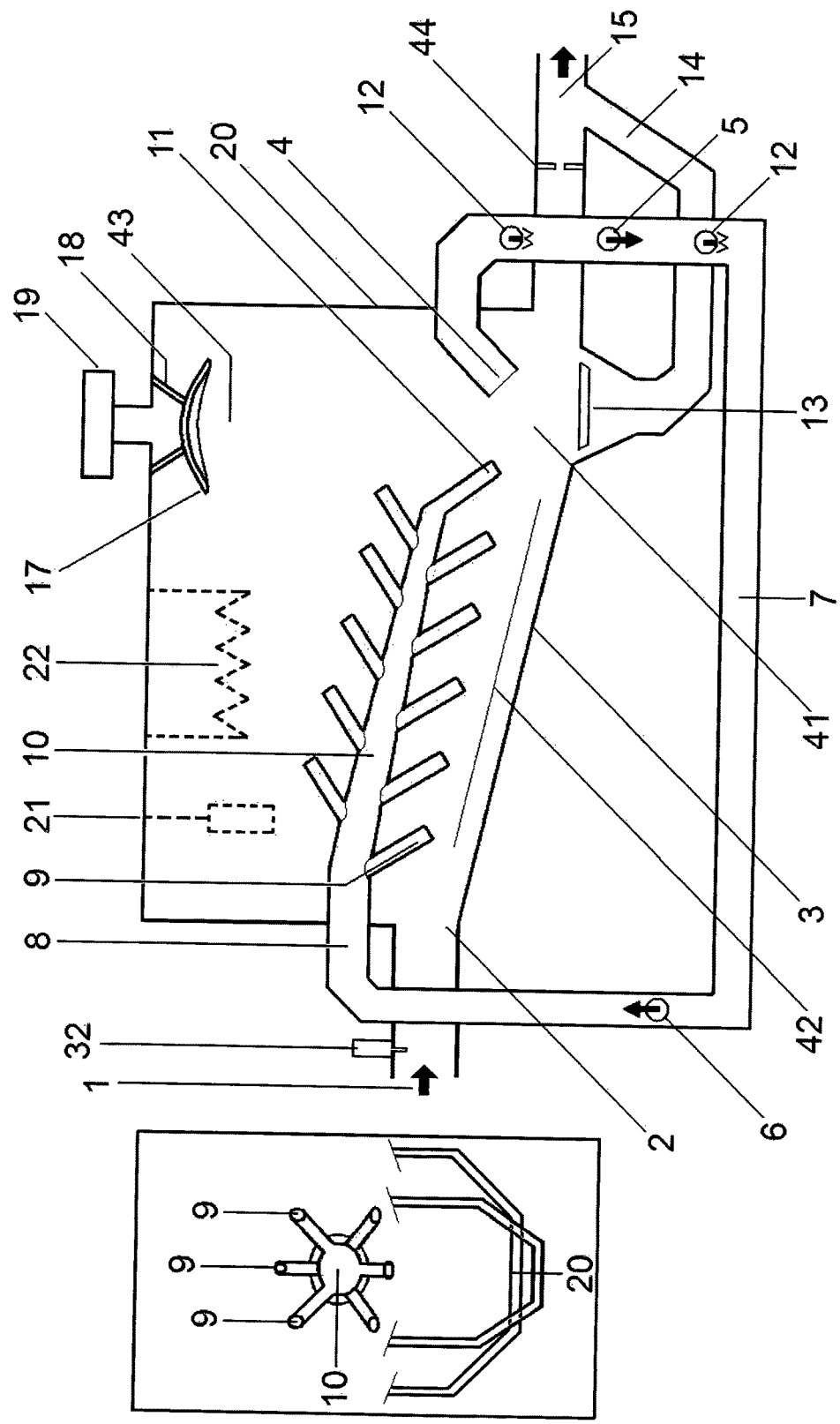
FIG. 2 depicts the pre-treatment device of the array in detail, which allows the optimal separation of the oily waste primary product into its byproducts, namely recovered oil, processed water and solids.

FIG. 1 and FIG. 2 show a preferred embodiment of the invention. While this particular embodiment will be described in detail below, several modifications will be appreciated by a person skilled in the art, so that the invention shall not be interpreted in a limited manner, referring to the description and the drawings. Rather the invention is defined by the appended claims.

Referring to a selected indicative example of industrial application of the invention, a number of the main sections and components of the device array are listed below. More specifically, the basic parts of the invention are the following:

1. Inlet pipeline/Input port.
2. Inlet portion, shaped for steady flow.
3. Tank chamber with inclined bottom and inclined sides.
4. Shaping of the inlet section, into the secondary flow loop (circuit).
5. Pump for circulation of the secondary loop (input).
6. Pump for circulation of the secondary loop (output).
7. Heat exchanger array of the secondary loop.
8. Return to the tank chamber.
9. Three dimensional injector arrays.
10. Shaping of the discharge of the secondary loop, in the form of a 'dendrite'.
11. Outmost nozzle injector into the main chamber.
12. Water injectors.
13. Drainage circuit.
14. Bypass circuit.
15. Output of the pre-treatment array, into the centrifuge array.
16. Filter array.
17. Shaping of the dome, under the filter array.
18. Holding brackets connected to the dome.
19. Filter.
20. Main tank chamber, where heating/stirring/mixing occurs.
21. Conventional stirring array.
22. Conventional heating array.
23. Oily waste separation array, for treatment of all kinds of oil/water mixtures.
24. Input of the primary product (oily waste) into the array.
25. Output of the recovered oil.
26. Output of the processed water.
27. Output of the solid products.
28. Boundaries of the array confines.
29. Pre-selection array.
30. Pre-treatment array.
31. Centrifuge array.
32. Chemical additive injection array.
33. Connection of heat flows, coupling thermally (7) and (30) to (35).
34. Connection of filtering for odor control and gas restriction.
35. Dehydration array.
36. Water processing array.
37. Solid management array.
38. Horizontal transfer of solids from the centrifuge array.
39. Array for filling of solid byproducts, with odor control covers.
40. Array for sealing of solid byproducts, with sealed covers.
41. Region of flow concentration, major stirring/mixing and discharge.
42. Region of ground effect, providing stirring/mixing.

43. Region of gas/vapor gathering and concentration.
44. Flow controller.

In FIG. 1, reference numeral 23 is designated the oily waste separator array. The array comprises six devices linked together and thermally connected, within the confines (28), that can treat oily waste (according to Marpol 73/78 Annex I specifications). The oily waste (primary product) enters in the input port (24), and in a single pass from the array, the separated byproducts are delivered at the corresponding output ports. Namely, the recovered oil is delivered at output (25), the processed water is delivered at output (26) and the solid products are delivered at output (27), in an energy efficient way, in conditions that can be applied in an urban environment, due to the effective odor control of the process.

According to the preferred embodiment shown, the array (23), shown in FIG. 1, encloses a pre-treatment device array (30), shown in FIG. 2.

With reference to FIG. 1, the primary product (oily waste) enters input port (24), and passes from the pre-selection array (29). Then it passes via the pre-treatment array (30), through the centrifuge array (31) to be separated and then passes to the dehydration array (35). From the dehydration array (35) the recovered oil is delivered, at output (25). The water separated at the centrifuge array (31), is processed at the water management array (36) and is delivered at the output (26). The solid byproducts are handled in the array (37), and are delivered at the output port (27). The whole array (23) has a continuous boundary seal indicated by the boundary confines (28), that allow the overall odor control, allowing the application of the oily waste treatment within urban environments.

The pretreatment array (30) shown in FIG. 1, is shown in greater detail in FIG. 2. This pretreatment array (30) allows the overall array (23) to handle low as well as high flash point oily waste primary products. The oily waste treated may have an oil content varying from 1 to 99%, in homogenized and emulsified oil/water mixtures.

It is taken in input port (24), and delivered at output port (25). The recovered oil is 99.9% water-free and has a high flash point. The processed water, delivered at output (26) is odor-free and clean (with oil traces less than 5 ppm).

Some special features of the pre-treatment array (30) are the following:

1 Due to the heating/mixing/stirring flow carried out in the secondary loop circuit out of the primary tank (20), (shown in FIG. 2), the discharge of the chemical additives that are dispensed via array (32), can be kept to a minimum.

2 The vapour and gases in the tank (20), are collected in region (43) that is created under the dome (17), that is suspended via links (18). The vapour and gases are eventually passed via filter (19) which is connected via filter connections (34), offering total odor control to the overall array (23), within confines (28).

The secondary loop circuit (shown in FIG. 2) that provides heating and stirring to the primary product (oily waste), substitutes the conventional stirring element (21) and the conventional heating element (22). The heating element (7) is connected and linked thermally to the dehydration array (35) via thermal connections (33).

4 Furthermore, it has a 'self-cleaning effect' feature that is made possible by use of pumps (5), (6) and water injectors (12).

2 The vapour and gases in the tank (20), are collected in region (43) that is created under the dome (17), that is suspended via links (18). The vapour and gases are eventually passed via filter (19) which is connected via filter connections (34), offering total odor control to the overall array (23), within confines (28).

The secondary loop circuit (shown in FIG. 2) that provides heating and stirring to the primary product (oily waste), substitutes the conventional stirring element (21) and the conventional heating element (22). The heating element (7) is connected and linked thermally to the dehydration array (35) via thermal connections (33).

4 Furthermore, it has a 'self-cleaning effect' feature that is made possible by use of pumps (5), (6) and water injectors (12).

5 The secondary loop circuit has a 'hydraulic overload' feature, in order to ensure a steady flow, between the secondary loop and the main tank (20), in the region (41), in conjunction with flow controller (44), in the output port (15), irrespective of the viscous characteristics of the primary product.

6 The secondary loop circuit has a series of heat exchangers (7), including free-flow and wide-gap for sludge.

By reference to FIG. 1, the array (23), within confines (28), comprises the pre-selection array (29), the pre-treatment array (30), the centrifuge array (31), the dehydration array (35), the water processing array (36), the solid treatment array (37), the horizontal transfer of solids from the centrifuge array (38), the array for filling of solid byproducts, with odor control covers (39) and finally, the array for sealing of solid byproducts, with sealed covers (40).

By reference to FIG. 2, the primary product (oily waste) enters the pre-treatment array (30), via input port (1). It passes via shaping (2) and enters the main Tank chamber (20).

Then, due to the slope (3) of the main tank chamber (20), it enters via the shaping (4) into the secondary loop circuit of the pre-treatment array (30). By use of pumps (5) and (6), the primary product (oily waste) is moved for heating through the secondary loop, to be heated by the heat exchangers (7), optimizing the use of chemical additives delivered via array (32), and is stirred and injected (upon returning to the main tank (20) via the re-entry port (8), by means of injector arrays (9), that are situated and positioned with a 'dendrite' structure (10).

This 'dendrite' structure allows the optimal mixing and stirring of the heated and treated primary product, by way of injection out the injector nozzles (9), the final outmost injector nozzle (11), in proximity with the tank bottom and sides that constitute region (42) and the main region (41). This heating/mixing process substitutes the conventional heating and stirring methods carried out by the conventional devices (21), (22), prior to entry into the centrifuge array (31).

The secondary loop circuit is complementary controlled in terms of flow conditions and pressure, in conjunction with flow controller (44), in the output port (15), which is in proximity with the region (41), the drainage circuit (13) and the by-pass circuit (14), as in FIG. 2.

The invention claimed is:

1. An oily waste treatment array, for use in a Marpol plant, in an urban environment, the oily waste treatment array comprising: six connected and thermally linked devices, within sealed confines, that treat a primary product that enters the oily waste treatment array, the connected and thermally linked devices comprising:
   (a) a pre-selection array through which the primary product is received via an input port passes to permit the primary product to be selected for treatment;
   (b) a pre-treatment array connected to an output of the pre-selection array, the pre-treatment array comprising:

a second input port through which the primary product selected for treatment from the pre-selection array is input into the pre-treatment array;

a section shaped into a main tank, the main tank having contracting sides and an inclined bottom inclined downwards from an entry side of the main tank to an exit side of the main tank;

a secondary heating/mixing loop circuit configured for processing of the primary product and for circulation of the primary product in the pre-treatment array, to ensure flow between the secondary heating/mixing loop circuit and the main tank, in a main region of the main tank; and an output port disposed on an exit side of the pre-treatment array, through which a part of the primary product which is output from the pretreatment array, wherein the secondary heating/mixing loop circuit comprises:

an entry section disposed on the exit side of the pre-treatment array and through which a portion of the primary product is circulated towards the entry side of the pre-treatment array;

an entry pump to pump said portion of the primary product towards the entry side of the pre-treatment array;

a dendrite discharge structure including plural injectors, the dendrite discharge structure discharging the primary product in plural directions, at least one of the plural directions being downwards towards the inclined bottom of the main tank, and one or more of the plural injectors directing the primary product towards the exit side of the main tank, the plural injectors including a final injector disposed at a distal end of the dendrite discharge structure to discharge the primary product towards the main region;

water injectors disposed downstream from the entry section of the secondary heating/mixing loop circuit;

a heat exchanger array;

an exit pump to pump said portion of the primary product via a re-entry port towards the dendrite discharge structure;

a drainage circuit coupling the main region of the main tank to the output port through which the part of the primary product is output from the pre-treatment array; and a by-pass circuit disposed in the drainage circuit to bypass the secondary heating/mixing loop circuit, the portion of the primary product being circulated by operation of the entry pump and the exit pump, via the re-entry port and the plural injectors, so as to achieve stirring/mixing, within the main tank, (c) a centrifuge array connected to the output port of the pre-treatment array, to separate the primary product into a recovered oil, a processed cleaned water and solid residues, (d) a dehydration array connected to a first output from the centrifuge array to receive the recovered oil and discharge the recovered oil, via an oil discharge port, (e) a water processing array connected to a second output from the centrifuge array to receive the processed cleaned water and discharge the processed cleaned water, via a water discharge port, and (f) a solid treatment array connected to a third output from the centrifuge array to receive the solid residues and discharge the solid residues, via a solid discharge port, wherein the oily waste treatment array has a energy efficiency due to the thermally linked devices, and can be operated in the urban environment due to filter connections that offer odor control by restricting a volatile gas and vapor, within the sealed confines, wherein the main tank includes poly-hedral characteristics including the contracting sides and the inclined bottom which is inclined downwards from the entry side to the exit side, along a flow of the secondary heating/mixing loop circuit that discharges the primary product along the dendrite discharge structure, inside the main tank, wherein within the main tank, the volatile gas and vapor are gathered in a region, that is formed underneath a dome of a filter, such that the volatile gas and vapor are fed to a second filter, and to the filter connections, wherein the oily waste treatment array, due to the thermal linking of the connected and thermally linked devices in which the primary product is treated, enables treatment in one pass, with the use of chemical additives dispensed via a device at the inlet port to the main tank, due to the treatment carried out in the pre-treatment array, allowing the treatment of homogenized water/oil mixtures, into the recovered oil, the processed cleaned water and the solid residues, wherein due to the thermally linking of the connected and thermally linked devices, the oily waste treatment array can be applied in the urban environment that ensure odor free conditions.

2. The oily waste treatment array, as claimed in claim 1, further comprising having an additional pretreatment array, to form a pair of pretreatment arrays that are configured to be in tandem.

3. The oily waste treatment array, as claimed in claim 1, wherein the secondary heating/mixing loop circuit is operated under pressure and the flow of the secondary heating/mixing loop circuit discharges the primary product along the dendrite discharge structure, determined by a concentration of a flow within the main region, in the main tank, at the pretreatment array, by means of the entry pump and exit pump and a flow controller, that can have a self-cleaning characteristic, by the use of the water injectors.

4. The oily waste treatment array, as claimed in claim 1, wherein the solid treatment array connected to the third output from the centrifuge array to receive the solid residues and discharge the solid residues comprises:

a horizontal handling transport of the solid residues connected to the centrifuge array to receive the solid residues, an array member for filling and enclosing of the solid residues, with odor control covers, connected to the horizontal handling transport to receive and fill the array member with the solid residues, and an array member for sealing of the solid residues in the array member for filling, being filled with the solid residues and sealed with covers to avoid odor of the volatile gas and vapor.

5. A Marpol plant incorporating the oily waste treatment array claimed in claim 1.

6. The oily waste treatment array as claimed in claim 1, further comprising having more than two pretreatment arrays in addition to the pre-treatment array that are configured to be in tandem.

7. A Marpol plant incorporating the oily waste treatment array claimed in claim 2.

8. The oily waste treatment array, as claimed in claim 2, wherein the secondary heating/mixing loop circuit is operated under pressure and the flow of the secondary heating/mixing loop circuit discharges the primary product along the dendrite discharge structure, determined by a concentration of a flow within the main region, in the main tank, at the pretreatment array, by means of the entry pump and exit pump and flow controller, that can have a self-cleaning characteristic, by the use of the water injectors.

9. The oily waste treatment array, as claimed in claim 2, wherein the solid treatment array connected to the third output from the centrifuge array to receive the solid residues and discharge the solid residues comprises:
   a horizontal handling transport of the solid residues connected to the centrifuge array to receive the solid residues,
   an array member for filling and enclosing of the solid residues, with odor control covers, connected to the horizontal handling transport to receive and fill the array member with the solid residues, and
   an array member for sealing of the solid residues in the array member for filling, being filled with the solid residues and sealed with covers to avoid odor of the volatile gas and vapor.

10. The oily waste treatment array, as claimed in claim 4, wherein the secondary heating/mixing loop circuit is operated under pressure and the flow of the secondary heating/mixing loop circuit discharges the primary product along the dendrite discharge structure, determined by a concentration of a flow within the main region, in the main tank, at the pretreatment array (30), by means of the entry pump and exit pump and a flow controller, that can have a self-cleaning characteristic, through the use of the water injectors.

11. The oily waste treatment array, as claimed in claim 3, wherein the solid treatment array connected to the third output from the centrifuge array to receive the solid residues and discharge the solid residues comprises:
   a horizontal handling transport of the solid residues connected to the centrifuge array to receive the solid residues,
   an array member for filling and enclosing of the solid residues, with odor control covers, connected to the horizontal handling transport to receive and fill the array member with the solid residues, and
   an array member for sealing of the solid residues in the array member for filling, being filled with the solid residues and sealed with covers to avoid odor of the volatile gas and vapor.

12. A Marpol plant incorporating the oily waste treatment array claimed in claim 3.

13. The oily waste treatment array, as claimed in claim 6, wherein the solid treatment array connected to the third output from the centrifuge array to receive the solid residues and discharge the solid residues comprises:
   a horizontal handling transport of the solid residues connected to the centrifuge array to receive the solid residues,
   an array member for filling and enclosing of the solid residues, with odor control covers, connected to the horizontal handling transport to receive and fill the array member with the solid residues, and
   an array member for sealing of the solid residues in the array member for filling, being filled with the solid residues and sealed with covers to avoid odor of the volatile gas and vapor.

14. A Marpol plant incorporating the oily waste treatment array claimed in claim 4.

15. The oily waste treatment array, as claimed in claim 5, wherein the solid treatment array connected to the third output from the centrifuge array to receive the solid residues and discharge the solid residues comprises:
   a horizontal handling transport of the solid residues connected to the centrifuge array to receive the solid residues,
   an array member for filling and enclosing of the solid residues, with odor control covers, connected to the horizontal handling transport to receive and fill the array member with the solid residues, and
   an array member for sealing of the solid residues in the array member for filling, being filled with the solid residues and sealed with covers to avoid odor of the volatile gas and vapor.

16. A Marpol plant incorporating the oily waste treatment array claimed in claim 6.

17. A Marpol plant incorporating the oily waste treatment array claimed in claim 8.

18. A Marpol plant incorporating the oily waste treatment array claimed in claim 9.

19. A Marpol plant incorporating the oily waste treatment array claimed in claim 10.

20. A Marpol plant incorporating the oily waste treatment array claimed in claim 11.

* * * * *